(12) United States Patent
Bonotto et al.

(10) Patent No.: US 11,426,031 B2
(45) Date of Patent: Aug. 30, 2022

(54) GRINDING DEVICE FOR AUTOMATIC COFFEE MACHINE

(71) Applicant: De'Longhi Appliances S.R.L., Treviso (IT)

(72) Inventors: Davide Bonotto, Treviso (IT); Emanuele Marcato, Treviso (IT)

(73) Assignee: De'Longhi Appliances S.R.L., Treviso (IT)

( * ) Notice: Subject to any disclaimer, the term of this patent is extended or adjusted under 35 U.S.C. 154(b) by 78 days.

(21) Appl. No.: 16/979,704

(22) PCT Filed: Mar. 25, 2019

(86) PCT No.: PCT/EP2019/057368
§ 371 (c)(1),
(2) Date: Sep. 10, 2020

(87) PCT Pub. No.: WO2019/185505
PCT Pub. Date: Oct. 3, 2019

(65) Prior Publication Data
US 2021/0038026 A1 Feb. 11, 2021

(30) Foreign Application Priority Data

Mar. 26, 2018 (IT) .................. 102018000003924

(51) Int. Cl.
*A47J 42/16* (2006.01)
*A47J 42/14* (2006.01)
(Continued)

(52) U.S. Cl.
CPC ............... *A47J 42/16* (2013.01); *A47J 42/14* (2013.01); *A47J 42/18* (2013.01); *A47J 42/46* (2013.01); *A47J 42/56* (2013.01)

(58) Field of Classification Search
CPC .. A47J 42/16; A47J 42/14; A47J 42/18; A47J 42/46; A47J 42/56; A47J 42/28; A47J 42/08; A47J 31/42
See application file for complete search history.

(56) References Cited

U.S. PATENT DOCUMENTS 4,876,953 A * 10/1989 Imamura ................. A47J 31/52
99/280
5,201,474 A * 4/1993 Midden ................... A47J 42/20
241/246
(Continued)

FOREIGN PATENT DOCUMENTS

DE 4407621 A1 9/1995
EP 1466547 A1 10/2004
(Continued)

OTHER PUBLICATIONS

English translate (FR1500290A) (Year: 2022).*
(Continued)

*Primary Examiner* — Jessica Cahill
*Assistant Examiner* — Mohammed S. Alawadi
(74) *Attorney, Agent, or Firm* — Blank Rome LLP

(57) ABSTRACT

Grinding device (1) for an automatic coffee machine, comprising: a support body (2); a lower grinder (3) and an upper grinder (4) arranged coaxially with respect to an axis (X) and delimiting a gap where the grinding is performed; a motor (21) for driving at least one of said grinders (3,4) in rotation about said axis (X); an adjustment ring nut (6) for adjusting the width of said gap having means for transforming a rotation thereof about said axis (X) into a translation of at least one of said grinders in the direction of said axis (X); and a gear for driving said ring nut (6) in rotation; where said gear comprises a toothed wheel arc (7) engaging a pinion
(Continued)

(8), and a mechanism for fixing said toothed wheel arc (7) in an adjustable position on said ring nut (6).

15 Claims, 5 Drawing Sheets

(51) Int. Cl.
*A47J 42/18* (2006.01)
*A47J 42/46* (2006.01)
*A47J 42/56* (2006.01)
*A47J 42/42* (2006.01)
*A47J 42/28* (2006.01)

(56) References Cited

U.S. PATENT DOCUMENTS

| | | | | |
|---|---|---|---|---|
| 5,207,148 A * | 5/1993 | Anderson | ............ | A47J 31/5253 99/290 |
| 5,511,465 A * | 4/1996 | Friedrich | ................ | A47J 31/46 99/305 |
| 6,149,084 A * | 11/2000 | Karg | ........................ | A47J 42/50 241/257.1 |
| 7,673,555 B2 * | 3/2010 | Nosler | ..................... | A47J 31/40 426/433 |
| 7,874,505 B1 * | 1/2011 | Lassota | ..................... | B02C 7/14 241/36 |
| 7,984,868 B2 * | 7/2011 | Anson | ..................... | A47J 42/44 241/261.2 |
| 8,181,894 B2 * | 5/2012 | Majer | ..................... | A47J 42/38 241/261.3 |
| 8,297,545 B1 * | 10/2012 | Lassota | ................... | A47J 42/46 241/285.2 |
| 8,371,211 B2 * | 2/2013 | Nosier | ..................... | A23F 5/262 99/287 |
| 8,763,942 B2 * | 7/2014 | Hergesell | ................ | A47J 31/42 241/261.2 |
| 9,125,518 B2 * | 9/2015 | Piai | ........................ | A47J 31/52 |
| 9,744,739 B2 * | 8/2017 | Grassia | ................. | B30B 15/144 |
| 10,130,215 B2 * | 11/2018 | Ioannone | ................ | A47J 31/42 |
| 10,327,593 B2 * | 6/2019 | Laffi | ....................... | A47J 42/44 |
| 10,595,671 B2 * | 3/2020 | Ottavi | ................. | A47J 31/3671 |
| 10,729,281 B2 * | 8/2020 | Knuepfel | ................. | B25J 9/026 |
| 10,813,500 B2 * | 10/2020 | Abbiati | ..................... | A23F 5/08 |
| 2007/0068393 A1 * | 3/2007 | Nosler | .................... | A47J 31/20 99/279 |
| 2007/0187534 A1 * | 8/2007 | Anson | ..................... | B02C 7/186 241/92 |
| 2010/0198413 A1 * | 8/2010 | De' Longhi | ............ | A47J 31/42 700/275 |

FOREIGN PATENT DOCUMENTS

| | | | | |
|---|---|---|---|---|
| ES | 2380402 T3 | 5/2012 | | |
| FR | 1500290 A | * 11/1967 | ............. | A47J 42/06 |
| FR | 1500290 A | 11/1967 | | |
| JP | S5543511 U | 3/1980 | | |

OTHER PUBLICATIONS

International Search Report dated Jun. 3, 2019; International Application No. PCT/EP2019/057368; International Filing Date Mar. 25, 2019; 4 pages.
Written Opinion dated Jun. 3, 2019; International Application No. PCT/EP2019/057368; International Filing Date Mar. 25, 2019; 5 pages.
English translation; French Publication No. FR1500290; Publication date: Nov. 3, 1967; 7 pages.
English translation; German Publication No. DE4407621; Publication date: Sep. 14, 1995; 9 pages.
English translation: Spanish Publication No. ES2380402; Publication date: May 11, 2012; 8 pages.
English translation; Japan Publication No. JPS5543511; Publication date: Mar. 21, 1980; 4 pages.

* cited by examiner

GRINDING DEVICE FOR AUTOMATIC COFFEE MACHINE

RELATED APPLICATIONS

This application is a U.S. national phase application of International Application No. PCT/EP2019/057368, filed Mar. 25, 2019; which application claims benefit of priority of Italy Application No. 102018000003924, filed Mar. 26, 2018. Each of the above-identified related applications are incorporated by reference.

FIELD OF USE

The present invention relates to a grinding device for an automatic coffee machine and a coffee machine that incorporates such a grinding device.

BACKGROUND OF THE INVENTION

A grinding device of the known type is equipped with a coaxial lower grinder and upper grinder that delimit an adjustable gap, and a hopper having an opening for unloading the coffee beans in the gap where the coffee beans are ground.

Generally in a grinding device of the known type a grinder, for example the lower one, rotates while the other grinder, for example the upper one, does not rotate but moves axially to alter the gap width and, consequently, adjust the degree of the beans' grinding.

The grinding device conventionally has a fixed support for supporting the lower grinder and the upper grinder and an adjustment ring nut whose perimeter has a toothed gear in one piece with a pinion for gripping the rotational movement.

Such solution entails negative effects because it does not allow an optimal use of the space available for the targeted placement of specific components, such as specific adjustment systems.

Therefore, due to the rigidity of the grinding device's structure, it does not adapt to the implementation of specific functionalities in a versatile manner.

The technical task of the present invention is, therefore, to provide a grinding device for an automatic coffee machine which obviates the above-described technical drawbacks of the prior art.

SUMMARY OF THE INVENTION

Within the scope of this technical task, an aim of the invention is to realize a grinding device for an automatic coffee machine that has a structure which is flexibly adaptable for the implementation of specific functionalities.

Another aim of the invention is to provide a grinding device for an automatic coffee machine capable of optimizing the occupation of spaces so as to increase its functionalities.

The technical task, as well as these and other aims, of the present invention is therefore to provide a grinding device for an automatic coffee machine, comprising:
  a support body;
  a lower grinder and an upper grinder arranged coaxially with respect to an axis and delimiting a gap where the grinding is performed;
  a motor for driving at least one of said grinders in rotation about said axis;
  an adjustment ring nut for adjusting the width of said gap having means for transforming a rotation thereof about said axis into a translation of at least one of said grinders in the direction of said axis; and
  a gear for driving said ring nut in rotation; characterized in that said gear comprises a toothed wheel arc engaging a pinion, and in that means are provided for fixing said toothed wheel arc in an adjustable position on said ring nut.

Preferably said toothed wheel arc is structurally independent from said ring nut.

Preferably, the support body has a cam which is tilted with respect to said axis and said adjustment ring nut comprises a feeler of said cam for its movement along said axis, or vice versa.

Preferably, the lower grinder is drawn in rotation by said motor and the upper grinder is drawn in translation along said axis solidly with said adjustment ring nut, said upper grinder being translatable along said axis due to the effect of its own weight or that of the coffee during the grinding step, said adjustment ring nut acting as a stroke end.

Advantageously the adjustable position fixing means comprise a series of stations arranged along the perimeter of said adjustment ring nut that can be selected for the assembly of different types of toothed wheel arcs.

In particular, the adjustable position fixing means comprise fixing screws for fixing a type of toothed wheel arc to a corresponding selection of stations of said series of stations.

Preferably the pinion can be driven by a motor.
Preferably the pinion can be driven manually by a handle.
Advantageously, the grinding device comprises a stroke end for stopping the rotation of the ring nut and adjustable position fixing means for fixing said stroke end on said toothed wheel arc.

Preferably the adjustable position fixing means for fixing said stroke end on said toothed wheel arc comprise feet of said stroke end and a grille with sectors that can be selected for the engagement of said feet.

In particular, the grille is fixed to said toothed wheel arc through screws.

Advantageously, the grinding device has a first sensor for sensing the position of said stroke end.

Preferably, the first sensor comprises a micro-switch that can be activated by mechanical interference with said stroke end.

Advantageously, the grinding device comprises a second sensor for sensing the rotation speed of said at least one rotating grinder.

In particular, the second sensor is configured so as to sense the rotation speed and stop the grinding when the rotation speed sensed is outside a range of predetermined values.

The invention also reveals a coffee machine characterized in that it incorporates a grinding device conforming to the detailed description which follows.

BRIEF DESCRIPTION OF THE DRAWINGS

Further characteristics and advantages of the invention will more fully emerge from the description of a preferred but not exclusive embodiment of the grinding device for an automatic coffee machine according to the invention, illustrated by way of non-limiting example in the accompanying drawings, in which.

DETAILED DESCRIPTION OF THE ILLUSTRATED EMBODIMENTS

Figure 1:
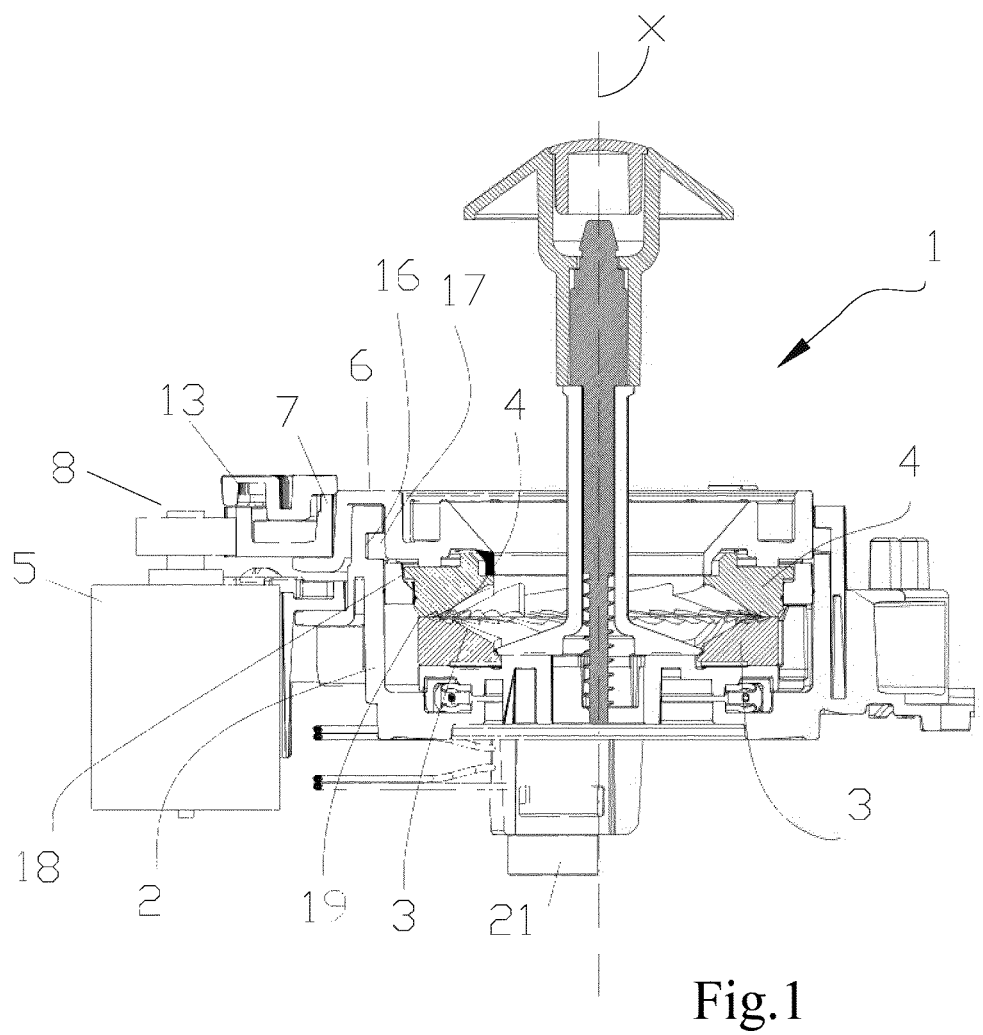
FIG. 1 shows a sectional lateral view from above of the grinding device.
Figure 2:
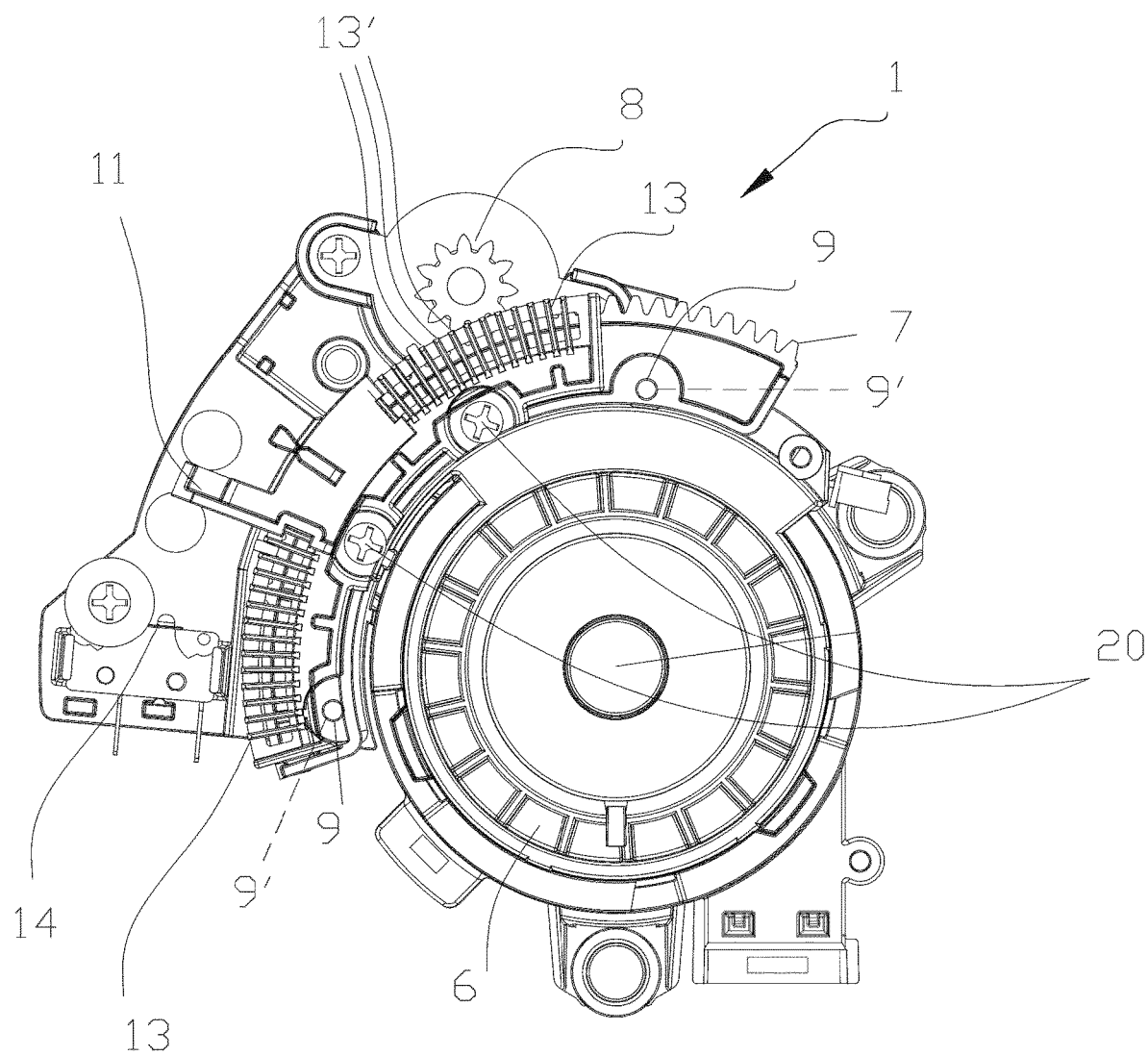
FIG. 2 shows a view from above of the grinding device of FIG. 1.
Figure 3:
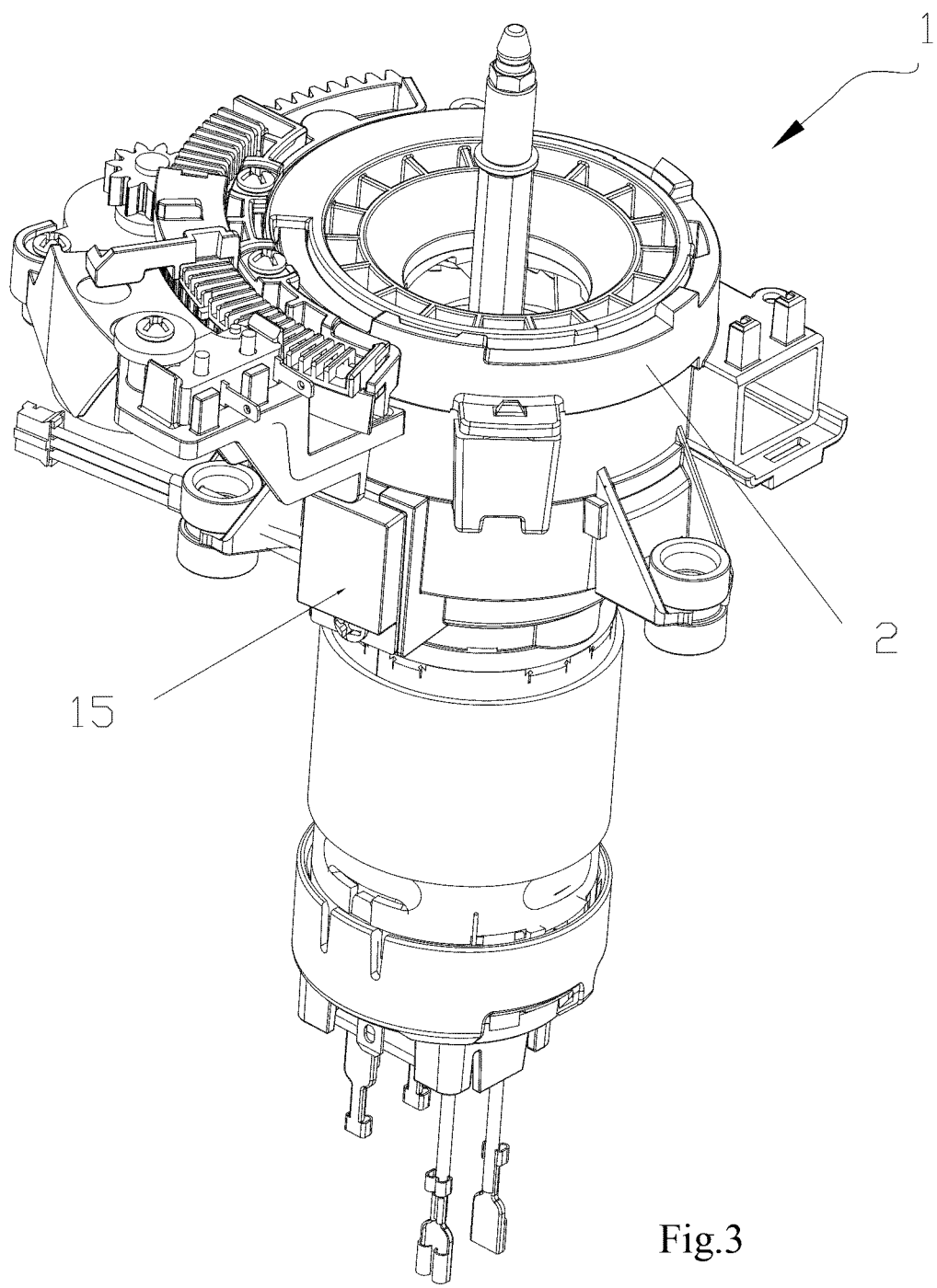
FIG. 3 shows a perspective view of the grinding device of FIG. 1 according to a first embodiment of the invention.
Figure 4:
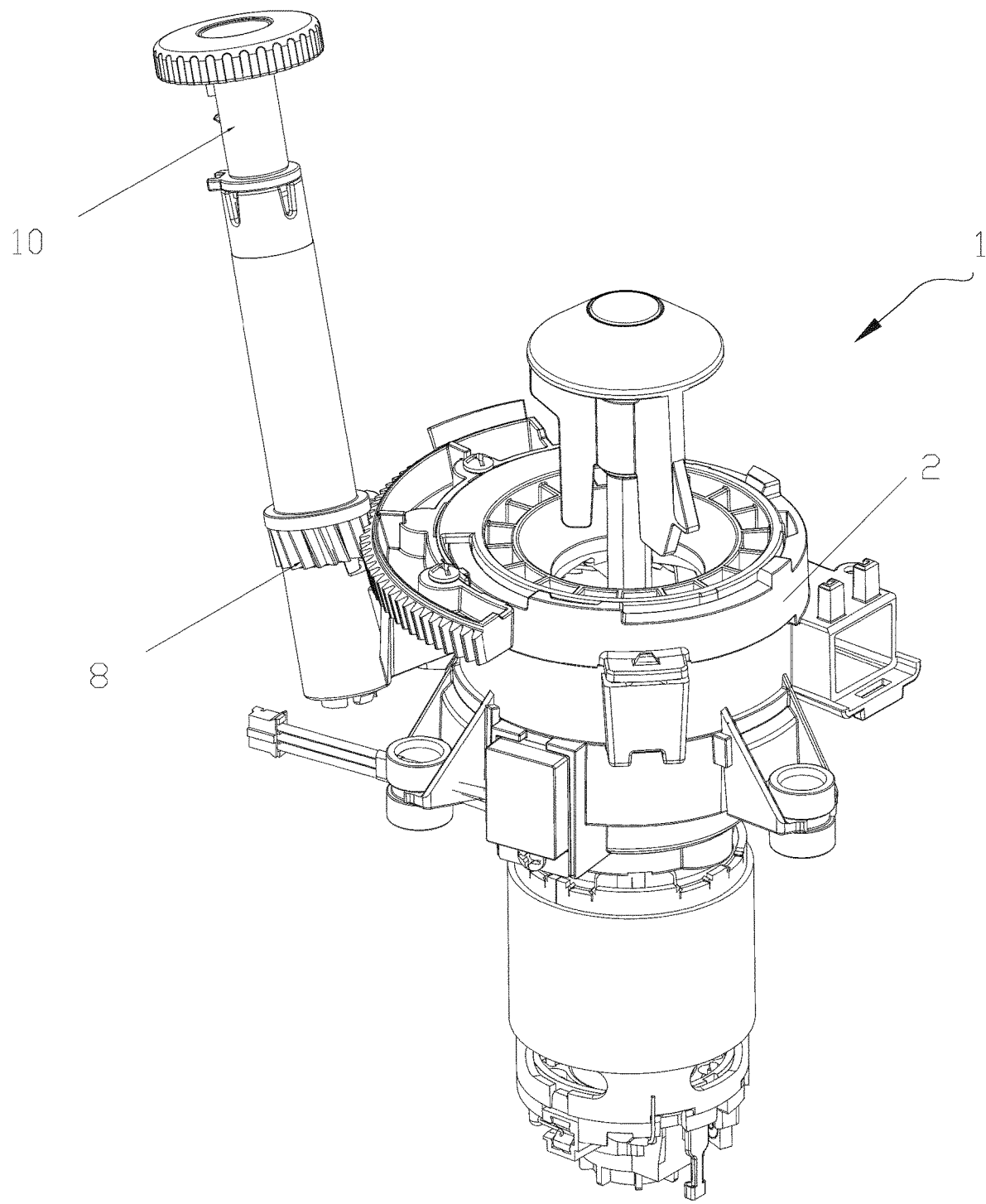
FIG. 4 shows a perspective view of the grinding device of FIG. 1 according to a second embodiment of the invention.
Figure 5:
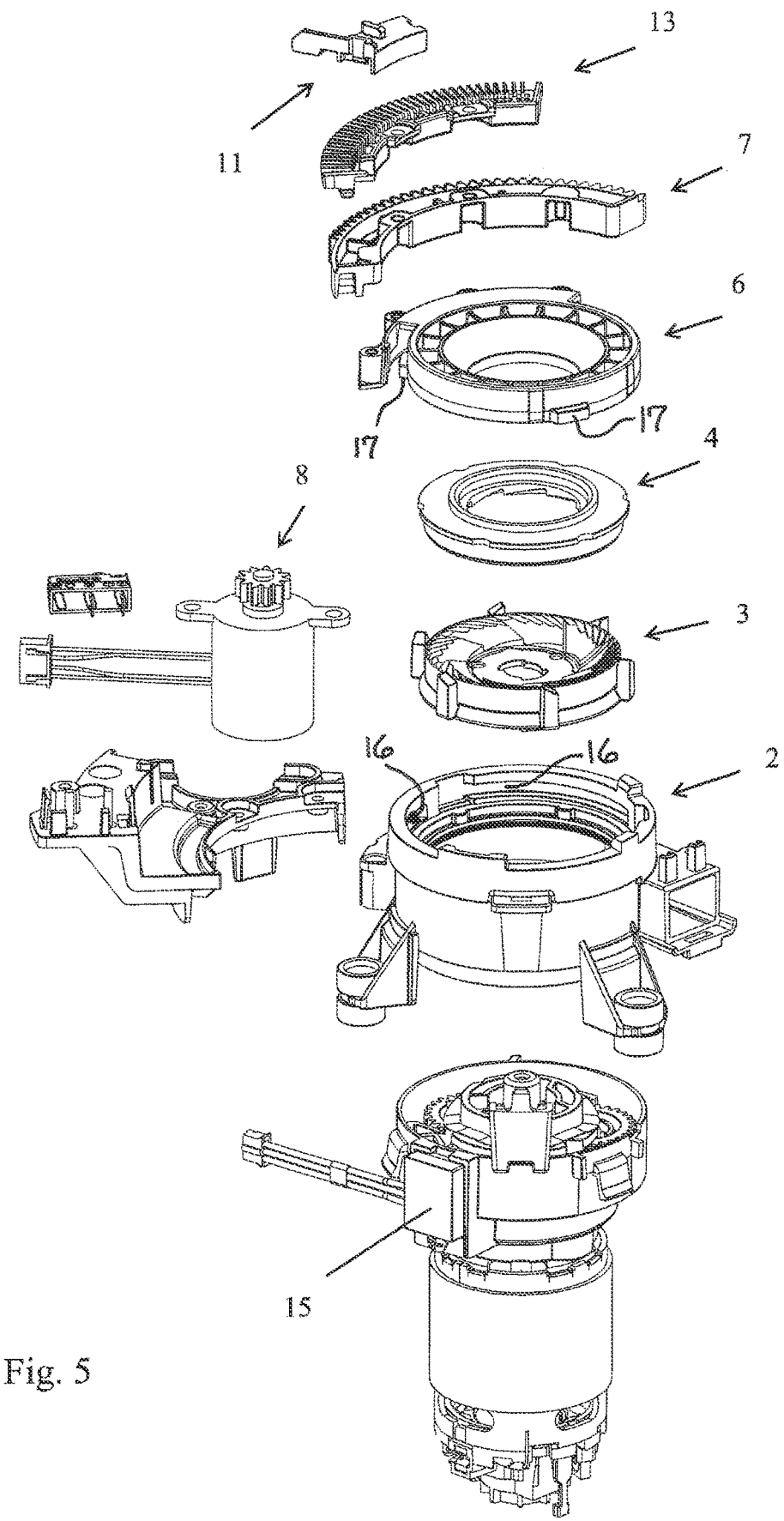
FIG. 5 shows an exploded view of the grinding device.

With reference to the figures mentioned, a grinding device for an automatic coffee machine is shown, indicated overall with the reference number 1.

The grinding device 1 comprises, in a known way, a support body 2 of a lower grinder 3 and an upper grinder 4.

The lower grinder 3 and the upper grinder 4 are arranged coaxially with respect to an axis X, in particular a vertical axis, and delimit a gap where the grinding is performed.

The support body 2 also supports a motor 21 for driving at least one of the grinders 3,4 in rotation about an axis X, in particular of the lower grinder.

The support body 2 lastly supports an adjustment ring nut 6 for adjusting the width of the gap, which is coaxial to the grinders 3, 4 and having means for transforming a rotation thereof about the axis X into a translation of at least one of the grinders 3,4, in particular the upper grinder, in the direction of said axis X.

More specifically, the support body 2 has the configuration of a glass having the grinders 3, 4 assembled on the inside thereof and the adjustment ring nut 6 assembled on its upper perimeter edge.

In particular, the adjustment ring nut 6 is provided with a rotation drive gear.

The gear includes a toothed wheel arc 7 engaging with a pinion 8.

The means for transforming a rotation of the adjustment ring nut 6 into a translation of the upper grinder 4 are described below.

In particular, the support body 2 has a cam 16 which is tilted with respect to the axis X wherein a feeler 17 of the cam 16 supported by the adjustment ring nut 6 is engaged.

The adjustment ring nut 6 has an inner horizontal perimeter guide groove 18 wherein an outer horizontal perimeter flange 19 of the upper grinder 4 is slidably engaged.

In this way, when the adjustment ring nut 6 rotates it raises or lowers depending on the direction of rotation, while the upper grinder 4, although not rotating, is drawn in translation upwards or downwards along the axis X solidly with the adjustment ring nut 6.

The vertical movement of the upper grinder 4 with respect to the lower grinder 3 that rotates while remaining at a fixed height makes it possible to adjust the gap between the grinders 3,4, and therefore the desired degree of the coffee beans' grinding.

Advantageously the upper grinder is translatable along the axis X due to the effect of its own weight or that of the coffee during the grinding step, and the adjustment ring nut 6 acts as a stroke end for the upper grinder.

Advantageously, the grinding device is provided with adjustable position fixing means for fixing the toothed wheel arc 7 to the adjustment ring nut 6.

Unlike the grinding device of a known type wherein the toothing is made in one piece with the adjustment ring nut, in the present invention the toothed wheel arc 7 is structurally independent from the adjustment ring nut 6.

Thanks to this solution, it is possible to choose the fixing position of the toothed wheel arc 7 on the adjustment ring nut 6.

In this regard, the fixing means of the adjustment ring nut 6 comprise a series of stations 9, for example a series of projections, arranged along the perimeter of the adjustment ring nut 7.

The stations 9 can be selected for the assembly of different types of toothed wheel arcs.

The toothed wheel arc 7 is fixed to the stations which are preferably selected by means of fixing screws 9'.

The adjustment ring nut 6 can be coupled to a motorized or manual drive system of the pinion 8.

In fact, in a first embodiment of the invention, the pinion 8 can be driven by a motor 5.

Instead, in a second embodiment of the invention, the pinion 8 can be driven manually by a handle 10.

The grinding device according to the present invention further comprises a stroke end 11 for stopping the rotation of the adjustment ring nut 6 and adjustable position fixing means for fixing said stroke end 11 on said toothed wheel arc 7.

In particular, the fixing means comprise feet (not shown) of the stroke end 11 and a grille 13 with sectors 13' that can be selected for the engagement of the feet.

The grille 13 is fixed to the toothed wheel arc 7 by means of screws 20.

The stroke end 11 is therefore fixed with the grille 13 in the desired position.

The grinding device advantageously has systems for controlling the correct operation of the grinders, the rotation speed, the positioning of the stroke end, etc.

In fact, at least a first sensor 14 for sensing the position of the stroke end 11 is provided.

The first sensor 14 comprises a micro-switch supported by the support body 2 that can be activated by mechanical interference with the stroke end 11.

The stroke end 11 position is acquired by rotating the adjustment ring nut 6 until it comes into contact with the first sensor 14.

At this point the actual position of the adjustment ring nut 6 is acquired by means of a potentiometer which reads the number of steps of the motor 5 driving the adjustment ring nut 6.

A second sensor 15 for sensing the rotation speed of the rotating grinder 3 is also provided.

The second sensor 15 is configured so as to sense the rotation speed and stop the grinding when the rotation speed sensed is outside a range of predetermined values.

The sensing of the number of revolutions made by the rotating grinder 3 also functions as a friction system for interrupting the grinding if the speed sensed is not within the predetermined time interval.

The sensing of the grinders' rotation speed makes it possible to understand if the grinder is working properly and if the position of the adjustment ring nut 6 actually corresponds to the desired grain size, or if an external event (e.g. the degradation of components) has occurred which renders this correspondence null.

The grinding device according to the invention achieves several advantages, as it makes it possible to optimize the occupation of space in the grinding device, thus expanding its functionality.

The grinder for an automatic coffee machine as conceived herein is susceptible to many modifications and variations, all falling within the scope of the invented concept; furthermore, all the details are replaceable by technically equivalent elements.

In practice the materials used, as well as the dimensions, can be any according to the needs and the state of the art.

The invention claimed is:

1. A grinding device (1) for an automatic coffee machine, comprising:
 a support body (2);
 a lower grinder (3) and an upper grinder (4) arranged coaxially with respect to an axis (X) and delimiting a gap where coffee grinding is performed;
 a motor (21) for driving the lower grinder (3) in rotation about said axis (X), the lower grinder (3) remaining in a fixed location, relative to said axis (X), during rotation about said axis (X);
 an adjustment ring nut (6) for adjusting a width of said gap, where rotation of the adjustment ring nut (6) about said axis (X) provides for a translation of:
 the adjustment ring nut (6) along said axis (X) in a first and in a second direction, said second direction being opposite said first direction, where the adjustment ring nut (6) rotates as the adjustment ring nut (6) translates;
 the upper grinder (4) along said axis (X) in the first and in the second directions, where the upper grinder (4), although not in rotational engagement with the adjustment ring nut (6), is drawn in translation with the adjustment ring nut (6) in the first and in the second directions; and
 a gear for driving said adjustment ring nut (6) in rotation; the gear comprising a toothed wheel arc (7) engaging a pinion (8), said toothed wheel arc (7) being in an adjustably fixed position on said adjustment ring nut (6);
 wherein:
 translation of said upper grinder (4), relative to said lower grinder (3), along said axis (X), adjustably delimits the gap, thereby providing a desired degree of coffee grinding; and
 said upper grinder (4) is further translatable along said axis (X) due to a weight of said upper grinder (4), or due to a coffee volume during coffee grinding, where said adjustment ring nut (6) acts as a stroke end.

2. The grinding device (1) for the automatic coffee machine according to claim 1, wherein said toothed wheel arc (7) is structurally independent from said ring nut (6).

3. The grinding device (1) for the automatic coffee machine according to claim 1, wherein said support body (2) has a cam (16) perimetrically located along an inner wall of said support body (2), the cam (16) being located along a plane that is oblique relative to a plane perpendicular to said axis (X), and said adjustment ring nut (6) comprises a feeler (17) configured to engage said cam (16) for movement of said adjustment ring nut (6) along said axis (X) in the first and in the second directions.

4. The grinding device (1) for the an automatic coffee machine according to claim 1, further comprising a series of stations (9) arranged along a perimeter of said adjustment ring nut (6) configured for selective locational placement that can be selected for the assembly of different types of toothed wheel arcs (7).

5. The grinding device (1) for the automatic coffee machine according to claim 4, further comprising fixing screws (9') configured to fix a type of toothed wheel arc (7) to a corresponding selection of stations of said series of stations (9).

6. The grinding device (1) for the automatic coffee machine according to claim 1, wherein said pinion (8) is driven by a motor (5).

7. The grinding device (1) for the automatic coffee machine according to claim 1, wherein said pinion (8) is driven manually by a handle (10).

8. The grinding device (1) for the automatic coffee machine according to claim 1, further comprising a stroke end (11) configured to stop rotation of the adjustment ring nut (6), the stroke end (11) being in an adjustably fixed position on said toothed wheel arc (7).

9. The grinding device (1) for the automatic coffee machine according to claim 8, wherein said stroke end (11) is adjustably fixed on said toothed wheel arc (7) by feet of said stroke end (11), and by a grille (13) with sectors (13') that can be locatably selected for engagement of said feet.

10. The grinding device (1) for the automatic coffee machine according to claim 9, wherein said grille (13) is fixed by screws (20) to said toothed wheel arc (7).

11. The grinding device (1) for the automatic coffee machine according to claim 8, further comprising a first sensor (14) configured to sense a position of said stroke end (11).

12. The grinding device (1) for the automatic coffee machine according to claim 11, wherein said first sensor (14) comprises a micro-switch that can be activated by mechanical interference with said stroke end (11).

13. The grinding device (1) for the automatic coffee machine according to claim 1, further comprising a second sensor (15) configured to sense a rotation speed of said lower grinder (3).

14. The grinding device (1) for the automatic coffee machine according to claim 13, wherein said second sensor (15) is configured to sense rotation speed, and to stop grinding, when rotation speed is outside a range of predetermined values.

15. A coffee machine including the grinding device (1) according to claim 1.

* * * * *